United States Patent
Lohmann et al.

(10) Patent No.: US 6,253,551 B1
(45) Date of Patent: Jul. 3, 2001

(54) DEVICE FOR CONTROLLING BOOST PRESSURE IN AN INTERNAL COMBUSTION ENGINE

(75) Inventors: Andrea Lohmann, Stuttgart; Michael Baeuerle, Markgroeningen; Klaus Ries-Mueller, Bad Rappenau, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/509,887
(22) PCT Filed: Sep. 10, 1998
(86) PCT No.: PCT/DE98/02673
§ 371 Date: Jul. 24, 2000
§ 102(e) Date: Jul. 24, 2000
(87) PCT Pub. No.: WO99/18339
PCT Pub. Date: Apr. 15, 1999

(30) Foreign Application Priority Data

Oct. 2, 1997 (DE) .............................................. 197 43 667

(51) Int. Cl.$^7$ ................................................. F02D 23/00
(52) U.S. Cl. ................................. 60/602; 60/612; 60/615
(58) Field of Search .................................. 60/602, 605.1, 60/612, 615

(56) References Cited

U.S. PATENT DOCUMENTS

| | | | |
|---|---|---|---|
| 4,466,248 | * | 8/1984 | Nartowski ............................. 60/602 |
| 4,660,382 | * | 4/1987 | Ueno et al. ........................... 60/602 |
| 4,748,567 | * | 5/1988 | Sumizawa et al. ............... 60/602 X |
| 4,891,946 | * | 1/1990 | Inoue .................................... 60/602 |
| 5,497,751 | | 3/1996 | Yukio . |

FOREIGN PATENT DOCUMENTS

| | | |
|---|---|---|
| 40 32 451 | 4/1992 | (DE) . |
| 195 13 156 | 5/1996 | (DE) . |

* cited by examiner

Primary Examiner—Hoang Nguyen
(74) Attorney, Agent, or Firm—Kenyon & Kenyon

(57) ABSTRACT

An arrangement includes a first controller which is only switched through to an actuator for a turbocharger if a fault recognition device detects no fault in the operation of the engine. A switchover is made from the first controller to a second controller, if the fault recognition device detects a critical fault. In this connection, the second controller receives a system deviation as an input signal that is different from the one received by the first controller. Thus in the event of a fault, the turbocharger can be controlled in a very flexible manner without the danger that the speed of the turbocharger is increased into its critical range.

7 Claims, 1 Drawing Sheet

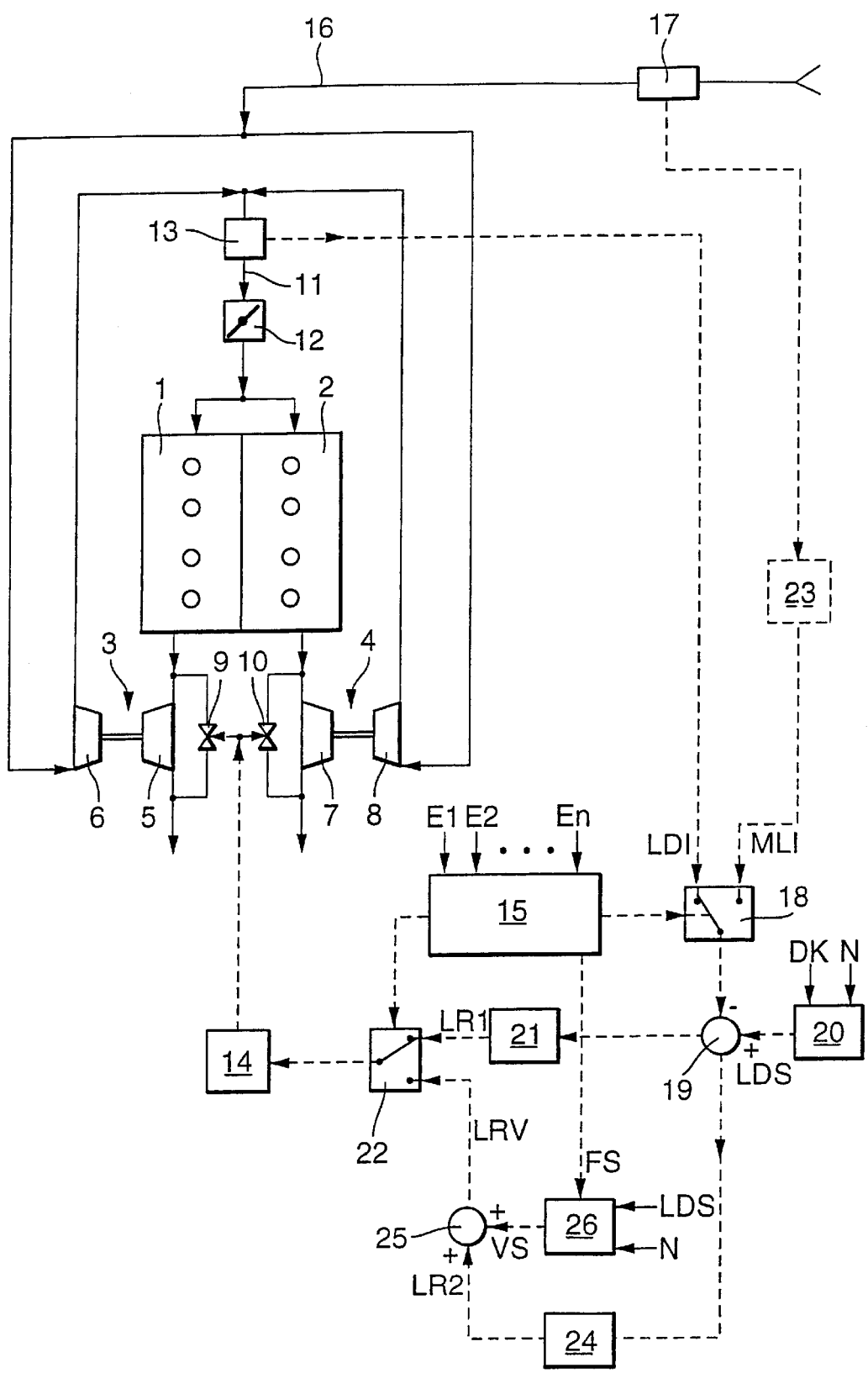

DEVICE FOR CONTROLLING BOOST PRESSURE IN AN INTERNAL COMBUSTION ENGINE

FIELD OF THE INVENTION

The present invention relates to an arrangement for controlling the boost pressure of an internal combustion engine which has a turbocharger in its at least one exhaust line and an actuator that acts on the turbocharger and is controlled by a first. The first controller is only switched through to the actuator when a fault detection device detects no fault in the operation of the engine.

BACKGROUND OF THE INVENTION

In boost pressure control, it may occur that a fault in the operation of the internal combustion engine (e.g., a combustion miss) or faulty sensors (e.g., air pressure sensor, air mass flow sensor) causes the speed of the turbocharger to be adjusted upward into a critical range and the turbocharger is permanently damaged as a result. German Patent No. 195 13 156 describes that this problem occurs, in particular, in internal combustion engines having two rows of cylinders with one turbocharger each. If one of the two turbochargers is in fact defective or a catalytic converter is clogged in one of the two exhaust lines, the control circuit will balance the system deviation of the actual boost pressure value from the setpoint boost pressure value caused by the fault occurring on one side by increasing the speed of the turbocharger on the side without a fault. In doing so, the speed of the turbocharger can reach a critical value, resulting in permanent damage to the turbocharger. In order to preclude permanent damage to a turbocharger in the event of a fault, as described in German Patent No. 195 13 156, the closed-loop control is switched off and a switchover is made to an open-loop control if a fault recognition device detects a fault in one side of the two exhaust gas lines. The open-loop control is designed in such a way that the speed of the turbocharger is not increased into its critical speed range. In contrast to closed-loop control, the actual value of charge air or air mass no longer has an influence on the control signal for the turbocharger in the event of a fault in open-loop control. The open-loop control limits the speed of the turbocharger to a constant value. In many types of faults, this value represents an overreaction in limiting the speed of the turbocharger to a constant value.

A control device for an internal combustion engine is described in U.S. Pat. No. 5,497,751, which provides two controllers for the control of the ignition and/or fuel injection for the individual cylinders. The identical input variables, which are provided by separate sensors, are supplied to both controllers so that both controllers make the same control information available to the ignition and/or injection device of the internal combustion engine. The control device therefore has a second controller in order to increase the reliability in an engine used in an airplane.

The objective of the present invention is to provide an arrangement that reacts with flexible control of the turbocharger in the event of a fault.

SUMMARY OF THE INVENTION

The object is attained in that a first controller which controls the turbocharger when no fault exists is switched off and a switchover is made to a second controller when a fault is detected in the operation of the engine. In this connection, the second controller receives a system deviation as an input signal that is different from the one received by the first controller boost pressure measured by an air pressure sensor in the intake path on the pressure side of the turbocharger serves as an actual value for the first system deviation and an air mass measured in the intake path on the suction side of the turbocharger serves as an actual value for the second system deviation. With such an arrangement, the control of the turbocharger can be adapted in an essentially more flexible manner to the type of the fault present than with a rigid control of the turbocharger.

A control signal suitable for the turbocharger in the case of a fault is produced by superimposing a precontrol signal on the output signal of the second controller. It is advantageous to make the precontrol signal dependent on the type of fault.

The fault recognition device should be capable of recognizing a great variety of signals. For example, it monitors the sensors required for the boost pressure control and/or an existing lambda control for errors and/or it detects combustion misses and signals a fault if a specific miss rate is exceeded.

In an internal combustion engine having two rows of cylinders with two turbochargers, both turbochargers are controlled simultaneously, a switchover taking place from the first to the second controller if the fault detection device detects a fault in the area of one of the two rows of cylinders.

BRIEF DESCRIPTION OF THE DRAWING

The FIGURE shows a block circuit diagram illustrating the function of an arrangement for controlling the boost pressure of an internal combustion engine according to the present invention.

DETAILED DESCRIPTION

An internal combustion engine having two rows of cylinders 1 and 2 is assumed in the exemplary embodiment shown in the drawing. Each of these two rows of cylinders 1 and 2 is equipped with a turbocharger 3 and 4. Tubocharger 3 has a turbine 5 in the exhaust channel of first row of cylinders 1 and a compressor 6 coupled with it in the intake channel. In the same manner, a turbine 7 of second turbocharger 4 is arranged in the exhaust channel of second row of cylinders 2 and compressor 8 coupled with it is arranged in the intake channel. Turbines 5 and 7 of the two tubochargers 3 and 4 are each equipped with a bypass valve 9 and 10 in a conventional manner. It is possible to control the boost pressure produced by each of turbochargers 3, 4 to a specific value via these bypass valves 9 and 10. Compressors 6 and 8 of the two turbochargers 3 and 4 feed their charge air into a common intake channel 11 in which a throttle valve 12 and an air pressure sensor 13 for the measurement of the boost pressure are located. At the output of throttle valve 12, intake channel 11 branches to the two rows of cylinders 1 and 2.

An actuator 14, a pulse valve, for example, activates the two bypass valves 9 and 10 of turbochargers 3 and 4 simultaneously. The boost pressure of the two turbochargers 3 and 4 can also be controlled via the geometry of turbines 5, 7 instead of bypass valves 9 and 10.

Inputs E1, E2 . . . En of a fault recognition device 15 are connected to peripheral units of the internal combustion engine in order to be able to detect their malfunctions. Of particular significance are the malfunctions described below. The malfunctions result in a critical speed increase of one or both turbochargers 3, 4. Fault recognition device 15 should therefore be capable of recognizing faults that originate from a boost pressure sensor 13, a boost pressure sensor 17 arranged in intake manifold 16, a lambda control (not shown) or a control loop fault. In addition, fault recognition device 15 should be capable of recognizing misfires in both rows of cylinders 1 and 2 and signal a fault if the misfire rate exceeds a specified limit value. The fault recognition may in addition extend to injection valve faults and faults in the ignition system. Also, an empty tank should be recognized as well as active injection blank-out periods.

In general, all faults which for any reason (e.g., catalytic converter fault on one side, turbocharger fault on one side, excessive misfire rate on one side, etc.) result in the speed of one of the two turbochargers 3, 4 being increased into a critical range must be detected.

If fault recognition device 15 does not recognize a fault, it places a switch 18 into such a position that an actual boost pressure value LDI measured by air pressure sensor 13 is switched through to a node 19 in which the stored actual boost pressure value LDI is determined in relation to a setpoint boost pressure value LDS, which is specified by a setpoint generator 20. Setpoint generator 20 is a characteristics map dependent on throttle valve position DK (or the gas pedal position) and engine speed N.

The system deviation between actual boost pressure value LDI and setpoint boost pressure value LDS present at the output of node 19 is supplied to a first controller 21 (e.g., a PDI controller). If there are no faults, fault recognition device 15 switches an additional switch 22 into such a position that output signal LR1 of first controller 21 arrives at the input of actuator 14. In such absence of a fault, the boost pressure of the two turbochargers 3 and 4 is thus controlled by a closed loop circuit having first controller 21.

If fault detection device 15 has now detected a fault, it moves switch 18 into a second position so that in place of the actual boost pressure value LDI measured by air pressure sensor 13, an air mass measured by an air mass sensor 17 is now supplied to node 19. A model actual boost pressure value MLI can be determined from the measured air mass in a contact unit 23 and this model actual boost pressure value MLI is then supplied to node 19.

While air pressure sensor 13, which supplies the actual value of a first system deviation determined for first controller 21, is arranged in the intake path on the pressure side of turbocharger 3, 4, air mass sensor 17, which supplies the actual value of a second system deviation specified for second controller 24, is arranged in the intake path on the suction side of the turbocharger.

The output signal of node 19, which indicates the storage of the actual value delivered directly by the air mass sensor 17 or the storage of the model actual boost pressure value MLI rather than the setpoint boost pressure value LDS, arrives at a second controller 24, which is preferably a P controller but also may be a PD or PID controller, for example. In a node 25, a precontrol signal VS is superimposed on output signal LR2 of second controller 24 in a node 25. This precontrol signal VS is formed in a contact unit 26 as a function of engine speed N and setpoint boost pressure LDS.

Fault recognition device 15 can report to precontrol 26 the type of fault recognized via a fault signal FS so that the precontrol generates a precontrol signal VS as a function of the type of fault.

Signal LRV originating in node 25 by the superimposition of controller output signal LR2 and precontrol signal VS is switched through to actuator 14. For this purpose, fault recognition device 15 moves switch 22 into the appropriate position. The second control loop including the superimposed precontrol prevents the speed of either of turbochargers 3, 4 from being increased into its critical speed range due to a fault. In particular, if one of the two turbochargers of a pair of turbochargers according to the embodiment is defective or a clogged catalytic converter in one of the exhaust lines brings about a system deviation on one side, the other turbocharger is prevented from attaining the setpoint boost pressure value by its speed being increased above its critical speed range.

The above-described switchover from a first control to a second control may also be used to protect the turbocharger of an internal combustion engine with only one row of cylinders in the event that the first control might increase the speed of the turbocharger to an unacceptable rate due to a fault.

What is claimed is:

1. An arrangement for controlling a boost pressure of an internal combustion engine, comprising:

at least one turbocharger arranged in at least one exhaust line of an internal combustion engine;

an air pressure sensor arranged in an intake path on a pressure side of the at least on turbocharger, the air pressure sensor measuring a boost pressure;

an air mass sensor arranged in an intake path on a suction side of the at least on turbocharger, the air mass sensor measuring an air mass;

an actuator acting on the at least on turbocharger;

a fault recognition device;

a first controller receiving a first system deviation as an input signal, the first controller being switched through to the actuator only when the fault recognition device detects no fault in an operation of the internal combustion engine that is critical for the at least one turbocharger, an actual value of the first system deviation being the boost pressure; and a second controller receiving a second system deviation as an input signal, a switchover being made from the first controller to the second controller when the fault recognition device detects a critical fault, an actual value of the second system deviation being the air mass.

2. The arrangement according to claim 1, wherein:

in the event of a fault, a control signal for the actuator is generated by superimposing a precontrol signal on an output signal of the second controller.

3. The arrangement according to claim 2, wherein:

the precontrol signal is a function of the type of fault.

4. The arrangement according to claim 1, wherein:

the fault recognition device monitors the air pressure sensor and the air mass sensor for faults.

5. The arrangement according to claim 1, wherein:

the fault recognition device monitors a lambda control for faults.

6. The arrangement according to claim 1, wherein:

the fault recognition device detects combustion misses.

7. The arrangement according to claim 1, wherein:

the internal combustion engine has two rows of cylinders and two turbochargers;

the actuator acts on the two turbochargers simultaneously; and the switchover takes place if the fault recognition device detects a fault in an area of one of the two rows of cylinders.

* * * * *